(12) United States Patent
Trescott

(10) Patent No.: US 6,840,724 B1
(45) Date of Patent: Jan. 11, 2005

(54) SPADE CONNECTOR FOR ATTACHING AN INTERMODAL CONTAINER TO A VEHICLE

(76) Inventor: William Bernard Trescott, 8028 Hwy. 457, Bay City, TX (US) 77414

( * ) Notice: Subject to any disclaimer, the term of this patent is extended or adjusted under 35 U.S.C. 154(b) by 0 days.

(21) Appl. No.: 10/696,365

(22) Filed: Oct. 30, 2003

(51) Int. Cl.⁷ ............................ B60P 1/00; B60P 7/13
(52) U.S. Cl. ........................ 410/77; 410/83; 414/458; 414/498
(58) Field of Search ................. 410/68, 77, 80, 410/83; 414/458, 495, 498

(56) References Cited

U.S. PATENT DOCUMENTS

| | | | | |
|---|---|---|---|---|
| 2,547,269 A | * | 4/1951 | Kinsey | 414/458 |
| 2,693,288 A | * | 11/1954 | Black | 414/458 |
| 2,934,228 A | * | 4/1960 | Hillberg | 414/458 |
| 3,018,905 A | * | 1/1962 | Thornton-Trump | 414/458 |
| 3,520,429 A | * | 7/1970 | Andersson | 414/421 |
| 3,707,238 A | * | 12/1972 | Thibodeau | 414/458 |
| 4,556,356 A | * | 12/1985 | Niva | 414/458 |
| 5,681,139 A | * | 10/1997 | Szanto | 414/495 |
| 5,879,122 A | * | 3/1999 | Voelzke | 414/458 |

FOREIGN PATENT DOCUMENTS

JP        58049530 A   *   3/1983   ............... 414/458

* cited by examiner

*Primary Examiner*—D. Glenn Dayoan
*Assistant Examiner*—Paul Chenevert

(57) ABSTRACT

A pivotally mounted spade connector for attaching an intermodal sea container to a U-shaped vehicle. A sleeve is rigidly connected to the container to receive the spade connector. A ledge is located on the U-shaped vehicle and is received within a groove on the container. The U-shaded vehicle lowers to the ground, backs up to surround the container, the ledge is guided onto the groove, and the spade connector is projected into the sleeve. The container is connected to the vehicle and both are raised in order to transport the container over roads.

10 Claims, 1 Drawing Sheet

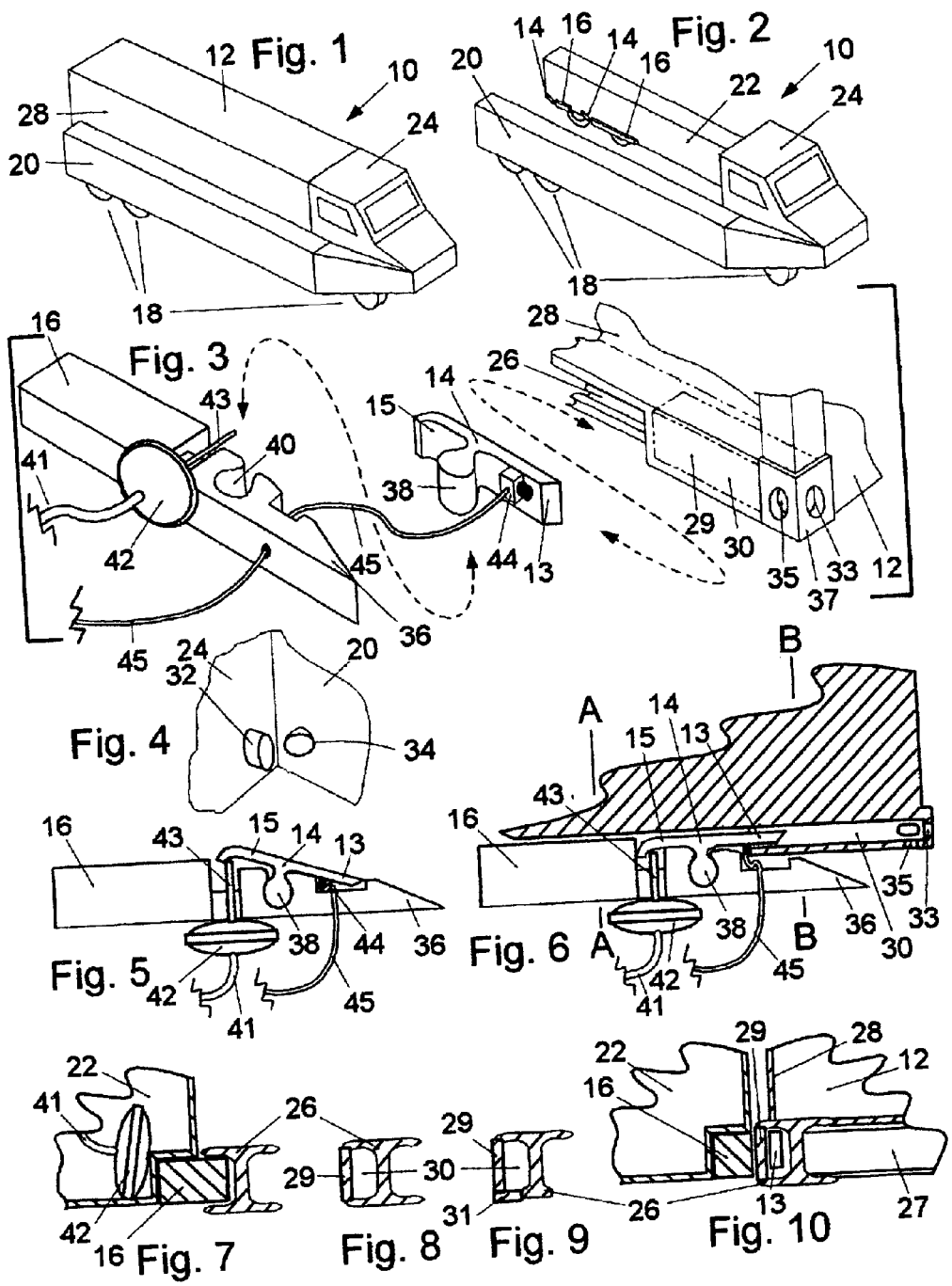

SPADE CONNECTOR FOR ATTACHING AN INTERMODAL CONTAINER TO A VEHICLE

FIELD OF THE INVENTION

The present invention relates to vehicles for transporting goods, and in particular to vehicles for transporting intermodal cargo containers, more particularly, to devices for attaching intermodal shipping containers to vehicles.

BACKGROUND OF THE INVENTION

Vehicles and trucks of various kinds are widely available for transporting goods. It is known to load trucks by mounting a large intermodal shipping container on a truck. Shipping containers of this type can be transferred from one form of transportation to another without unloading or handling the goods contained therein. Thus a shipping container may be initially loaded, then placed on a truck, transferred to a railroad car, set on a ship, removed to another railroad car, and finally carried by another truck to a final destination, all without handling the goods loaded in the shipping container. Trucks for carrying intermodal shipping containers in this manner are generally quite tall and, consequently, unstable. It is an object of the present invention, therefore, to provide a means for attaching a container to a vehicle that presents a relatively low, wide and stable configuration.

Further, cranes or other apparatus have usually been necessary for transferring the containers from one form of transport to another. Such a container could not be easily unloaded from a truck, stored, and reloaded on the truck without additional lifting apparatus. It is a further object of the present invention to provide a vehicle with the means to pick up and set down a large shipping container without auxiliary mechanisms.

One form of vehicle for moving containers has a U-frame with rearwardly extending side frames or beams. Such vehicles are shown, for example, in U.S. Pat. No. 4,556,356 to Niva and U.S. Pat. No. 5,879,122 to Voetzke. As explained by Niva, such trucks are driven backward to a container standing on the ground. The open end of the U-frame is moved backwards such that the U-frame will enclose the container on three sides. As mentioned in Niva and as described in Voetzke, a second inner U-frame is then lifted hydraulically to contact the container and lift it into a tort position. Niva seeks to eliminate the second inner lifting frame by providing specialized coupling for connecting hydraulic cylinders on the vehicle directly to specialized brackets on the container. Nevertheless, it is still difficult to provide a method of attachment that can be easily driven around a relatively long container. In both Niva and Voetzke, for example, the containers shown are relatively more narrow near the ground and have a widened top to engage an inner U-frame or special hydraulic lifts while providing clearance near the ground for the first U-flame of the vehicles. Such a shape for the container is suitable for the refuse containers described in Voetzke or the mining containers described by Niva Standardized shipping containers, by contrast, need a rectangular shape so that they can be stacked in ships, for example. It is an object of the present invention, therefore, to provide a U-frame vehicle with the capability to move containers with improved facility for placing the vehicle around a substantially rectangular shipping container and attaching the container to the vehicle.

SUMMARY OF THE INVENTION

The Spade Connector for Attaching an Intermodal Container to a Vehicle of my invention comprises a sleeve shaped female part to be rigidly attached to a shipping container and a spade shaped male part to be pivotally attached to a vehicle. The spade is normally carried in a retracted position to protect it from damage while the vehicle maneuvers around the container, but then extends when the vehicle contacts the container so it can be inserted into the sleeve during the attachment operation to secure the container to the vehicle.

BRIEF DESCRIPTION OF THE FIGURES

FIG. 1 is a perspective view of a vehicle having a "U" shaped frame with a cargo container.

FIG. 2 is a perspective view of the "U" shaped vehicle of FIG. 1 with a plurality of lifting ledges and spade connectors according to the present invention FIG. 3 is an exploded perspective view of a lifting ledge and a spade connector according to the present invention with the left rear bottom corner of the cargo container of FIG. 1.

FIG. 4 is a perspective view of the right rear bottom corner of the operator's cab of the "U" shaped vehicle of FIG. 2.

FIG. 5 is a top plan view of the lifting ledge and spade connector assembly of FIG. 3.

FIG. 6 is a top cut away view of the corner of the container of FIG. 3 with a lifting ledge and spade connector assembly.

FIG. 7 is a rear cut away view of the lifting ledge of FIG. 6 at station A with an "I" beam.

FIG. 8 is a rear cut away view of the "I" beam of FIG. 7 with a sleeve according to the present invention.

FIG. 9 is a rear cut away view of the sleeve of FIG. 8 with a "T" shaped beam.

FIG. 10 is a rear cut away view of the container corner and lifting ledge and spade connector assembly of FIG. 6 at station B.

DETAILED DESCRIPTION

I will now describe the preferred embodiment of my invention with reference to the accompanying drawings, wherein like numerals are used to refer to like parts.

FIGS. 1 and 2 show perspective views of a container carrying vehicle 10 which has an operator's cab 24 in the front, a left rearward projecting frame 22, a right rearward projecting shaped frame 20, and also a plurality of spade connectors 14 and lifting ledges 16 according to my invention. A container 12, is partially enclosed on three sides by the vehicle frames 20, 22 and the vehicle cab 24. It will be understood that the wheels 18 of the vehicle 10 are mounted on a variable height suspension capable of lowering the entire vehicle together with the container 12 onto the ground when the wheels are retracted upward into the vehicle, and also of lifting the entire vehicle along with the container off of the ground when the wheels are extended downward.

When the vehicle 10 lifts the container 12, the weight of the container is primarily supported by a plurality of lifting ledges 16 which are rigidly attached to the rearward projecting frames 20 and 22, as will be explained more fully below.

FIG. 3 shows an exploded perspective view of a lifting ledge 16, a spade connector 14, and the left rear bottom corner of a container 12. It is well known to those knowledgeable in the art that intermodal cargo containers such as the container 12 shown usually comprise "I" or "T" section beams 26 along the bottom side edges to which the container's walls 28 and floor joists 27 are attached as shown in FIG. 10. It is also known that such beams have a groove on the side into which the lifting ledge 16 can fit as shown in FIG. 7. To prevent the lifting ledge 16 from flexing away from the beam 26 while the vehicle is in transport, thus causing the container 12 to become unsupported and fait onto the ground, a spade connector 14 is attached to the lifting ledge 16 which is ad to be received into a sleeve 30 attached to the beam 26 of the container 12 in the manner of a male part into a female part as shown in FIG. 6. In my preferred embodiment, the sleeve 30 is formed by welding an ordinary flat steel plate 29 to the edges of the beam 26 as shown in FIG. 8. One knowledgeable in the art will recognize that cargo containers such as the cargo container 12 ran be made of a variety of materials other than steel and that other materials and fastening methods can also be used to manufacture a sleeve. If the beam 26 is "T" shaped in cross section as in FIG. 9, a second flat plate 31 should be fastened between the bottom edge of the first plate 29 and the beam 26 to form a box structure as shown in FIG. 3 and FIG. 6. In FIG. 10, the sleeve is shown occupied by the spade 13 of the spade connector 14 on a vertical plane immediately forward of station B of FIG. 6.

One skilled in the art will recognize that beams, sleeves, and box structures can be fastened to a variety of different types of containers. Therefore, the preferred embodiment described above is intended to be illustrative and not restrictive. One skilled in the art will recognize that if a container has a box section beam or if the container itself were a simple rectangular box such as a water or fuel tank made of six rectangular steel plates welded together along the edges, slot shaped holes could be cut in the bottom edge of the container or the side of a box beam to accommodate the lifting ledges and spade connectors described above, with or without reinforcing material such as additional steel plates added to the inside of the box or beam, to perform the same function as the sleeve and groove described above without departing from the teachings of this invention.

FIG. 4 shows a perspective view of the right rear bottom corner of the operator's cab 24 of the vehicle 10 of FIG. 2. The back of the vehicle cab 24 is equipped with a lifting pin 32 which engages an oval shaped hole 33 in the corner of the container 12. Those knowledgeable in the art will recognize that intermodal shipping containers such as the container 12 in FIG. 3 are usually equipped with a plurality of identical holes in all eight corners, thus although the left rear corner 37 of the container 12 as shown would normally be carried in the left rear of the vehicle, under special circumstances, such as to prevent entry into the rear cargo doors of the container (not shown), the container 12 could be carried with the left rear corner touching the right rear of the cab 24, the rear of the container facing forward. Therefore, the lifting pin 32 of FIG. 4 is capable of engaging the oval shaped hole 33 of FIG. 3. To prevent the container 12 from sliding award and becoming disengaged from the lifting pin 32 and the plurality of spade connectors 14 during a vehicle acceleration, a retractable spring loaded safety pin 34 is provided in the rearward extending frame 20 near the lifting pin 32 of the cab 24 in such a way that the safety pin 34 of FIG. 4 is capable of engaging the oval shaped hole 35 of FIG. 3 when the lifting pin 32 is engaged in the oval shaped hole 33 of FIG. 3. The safety pin 34 should be beveled on the end like a door latch so that it will automatically retract into the rearward extending frame 20 when struck by the corner 37 of the container 12 and snap outward into the oval shaped hole 35 when the plurality of spade connectors 14 are properly engaged with their sleeves. The safety pin 34 should also be equipped with a remote control retraction mechanism such as an attached electrical solonoid or a pneumatic or hydraulic piston (not shown) so that the container 12 can be disengaged from the vehicle 10 once it is lowered onto the ground.

Similar pins should be installed in a symmetrical configuration on the left side of the vehicle cab 24 and the rearward extending frame 22 so that the container 12 will be supported on both sides. Those knowledgeable in the art will recognize that safety pins could also be installed behind the spade connectors 14 on the lifting ledges 16, but it is preferred that the rearmost lifting ledges have a beveled rear portion 36 to increase the facility for attaching the container 12 to the vehicle 10 as will be discussed in greater detail below.

FIG. 5 is a top plan view of the lifting ledge and spade connector assembly of FIG. 3. The connector 14 is attached to the lifting ledge 16 by a pivot 38. In my preferred embodiment, both the spade connector 14 and the lifting ledge 16 are made of drop forged or hammered steel though one knowledgeable in the art will recognize that other materials could be used. As an aid in manufacture, the pivot 38 need not be perfectly cylindrical, but should be slightly conic as conic surfaces are easier to fabricate by forging while the manufacture of cylindrical surfaces usually requires a casting method which is more prone to catastrophic failure and requires more complex methods of quality control. A conic surface also provides a tighter fit with less slop, stress, and fatigue when the conic sections are wider near the top than at the bottom as gravity will pull the spade connector downward to compensate for normal wear and tear, thus maintaining a tight fit over the life of the vehicle. To minimize damage to the vehicle or the container during a violent off road collision avoidance maneuver, the strength of the spade 13 should be carefully calibrated to be less than that of the lifting ledge 16 or the sleeve 30. If the spade 13 breaks away from the pivot 38, it should be easily replaceable by dropping a new one into the cove 40 in the lifting ledge 16 so that the vehicle can be easily repaired.

FIG. 5 also shows a piston chamber 42, which by means of a connecting rod 43 pushing against a toggle 15, pivots the spade connector 14 at an angle with respect to the lifting ledge 16 when not engaged with a container. It will be understood that the wheels 18 of the vehicle 10 are independently steerable so as to provide a means to adjust the distance between the right rearward projecting frame 20 and the left rearward projecting frame 22, the frames 20 and 22 being made of bendable flexible material such as fiberglass reinforced plastic so as to permit such an adjustment. To lift the container 12, the vehicle 10 is first backed around one end of the container until the container is surrounded on three sides as shown in FIG. 1. If the vehicle 10 is not in perfect alignment with the container 12, the bevel 36 on the rearmost lifting ledge 16 attached to the left rearward projecting frame 22, together with the angled spade 13 and toggle 15, will contact the corner 37 of the container 12 in such a way as to force the rearward projecting frames 20 and 22 apart to facilitate alignment. A similar bevel (not shown) should be provided on the rearmost lifting ledge on the right rearward projecting frame 20 to facilitate alignment on both sides of the vehicle simultaneously, though one skilled in the art will recognize that similar bevels are not needed on lifting ledges installed in places other than the extreme rear of the vehicle. Once the vehicle and container are properly aligned, the wheels 18 can be independently steered in such a way as move the frames 20 and 22 toward the container 12 as the vehicle moves rearward until the toggle 15 contacts the beam 26, causing the spade connector 14 to pivot until it is in a position parallel with the beam 26 so that the spade 13 engages the sleeve 30 as shown in FIG. 6. Similar spade connectors, lifting ledges, and piston chambers should be installed on both sides of the vehicle so that the container 12 is supported on both sides.

Those knowledgeable in the art will recognize that although a pneumatic piston chamber 42 is shown, a hydraulic cylinder or other types of springs or flexible materials could also be used to pivot the spade connector 14 without departing from the teachings of this invention. It is well known that pneumatic piston chambers usually contain an internal flexible diaphragm to prevent the leakage of working fluid so they can maintain pressure (or vacuum) continuously without additional effort such as the continuous cycling of hydraulic fluid through a pressure relief valve. A pneumatic piston chamber is therefore preferred over a hydraulic cylinder because it can apply continuous clamping pressure to the spade 13 through the toggle 15 and the pivot 38 to secure the container to the vehicle even when the supply of control fluid is disengaged. Fluid should be supplied through the hose 41 to the piston chamber 42 while the vehicle is in transport to prevent relative movement between the vehicle and container that could result in additional wear and tear of the lifting ledges, spades, and sleeves. Fluid should not be supplied to the chamber while the vehicle is engaging or disengaging the container because such pressure may prevent the spade 13 from pivoting into position to properly engage the sleeve 30.

To ensure that the spade 13 assumes a proper angle to facilitate alignment with the vehicle while a container is being engaged and yet still pivot into proper position to engage the sleeve 30, a carefully calibrated spring (not shown) should be provided inside the chamber 42 or the chamber should contain a flexible diaphragm (not shown) that performs the same function as a spring to move the connecting rod 43 to an extended position whenever fluid is not supplied to the chamber, the spring or diaphragm being flexible enough to yield when the toggle 15 comes into contact with the beam 26. Regardless of the type of spring, when fluid is supplied, the chamber should be capable of exerting sufficient force to prevent the spade 13 from pivoting into position to engage a sleeve when a container has a plurality of sleeves. It is intended that when a plurality of sleeves are attached to a side of a container, that fluid should be supplied to the piston chamber until the vehicle is in proper position to engage the container so that a spade will not engage the wrong sleeve, then the supply of fluid should be discontinued until the container is properly engaged, and then fluid should be resupplied to firmly clamp the container to the vehicle. To further restrain relative movement between the container and the vehicle, a friction enhancing surface (not shown) such as knobs, pits, or ridges can be molded or hammered onto the spade 13 and the plate 29 of the sleeve 30 during manufacture.

Because the spade connector 14 cannot be visually ins once it is engaged with the sleeve 30, a safety switch 44 and a wiring harness 45 should be attached to the spade connector 14 which will activate a green indicator light (not shown) inside the operator's cab 24 when the spade connector is properly engaged. Similar switches, wiring harnesses, and lights should be installed on all the spade connectors on the vehicle. Though a button switch is shown, one skilled in the electrical arts will recognize that many types of switches could also be used. Switches (not shown) should also be attached to safety pins such as the safety pin 34 which will activate separate red lights inside the operator's cab if the safety pins are not properly engaged in oval holes in the corners of the container. It is preferred that when the vehicle engages the container, the operator should see red lights come on briefly when the safety pins are pushed inward upon contacting the container, followed by the red lights going out when they snap into proper position in the container's oval holes, then green lights coming on continuously when the spades successfully engage the sleeves on the container. It is believed that the above described system of lights will negate the need for the operator to exit the vehicle to ascertain whether the vehicle is safe to drive, thus allowing a skilled operator to pick up a sealed cargo container and drive away with it in a matter of seconds. This is a design improvement over existing truck semi-trailer chassis that also carry containers, because the need to exit the vehicle to connect air hoses and electrical cables between the semi-tractor and the trailer chassis and also to conduct the legally required fifteen minute pre-trip inspection of the trailer chassis, suspension, lights, tires, wheel bearings, and brakes is eliminated. Thus, a task that in the past required more than fifteen minutes will with my invention require less than fifteen seconds. One skilled in the art will recognize that other methods for providing controls may be selected without departing from the teachings of this invention.

Although I have now described my invention in connection with my preferred embodiment, those skilled in the art will recognize that my invention may take other forms without departing from the spirit or teachings thereof. There is a broad variety of vehicles such as cranes, ships, and barges that could also be equipped with my invention to carry containers other than just "U" shaped trucks. The foregoing description is intended, therefore, to be illustrative and not restrictive, and the scope of my invention is to be defined by the following claims:

What is claimed is:

1. An assembly for lifting and transporting a container, said assembly comprising a male part and a female part, said female part further comprising a groove and a sleeve rigidly attached to a support beam attached to said container,
said male part further comprising
a ledge, adapted to be received in said groove of said female pr capable of bearing the weight of said container,
a spade, adapted to be received within said sleeve of said female part, connected to said ledge by a pivot, said spade capable of restraining said ledge within said groove of said female part.

2. The assembly for lifting and transporting a container of claim 1, wherein said pivot is conic.

3. The assembly for lifting and transporting a container of claim 1, wherein said spade of said male part further comprises a toggle adapted to be received in said groove of said female part, capable of pivoting said spade into alignment with said sleeve of said female part to be received in said sleeve when said toggle is received in said groove.

4. The assembly for lifting and transporting a container of claim 3, wherein said toggle further comprises a piston chamber capable of pivoting said spade out of alignment with said sleeve when said spade is received within said sleeve, further restraining said ledge of said male part within said groove.

5. The assembly for lifting and transporting a container of claim 4, wherein said piston chamber has increased facility to pivot said spade out of alignment with said sleeve to prevent said spade from being received within said sleeve.

6. The assembly for lifting and transporting a container of claim 1, wherein said spade has a friction enhancing surface.

7. The assembly for lifting and transporting a container of claim 1, wherein said sleeve has a friction enhancing surface.

8. The assembly for lifting and transporting a container of claim 1, wherein said spade further comprises a switch capable of activating an indicator when said spade is received within said sleeve.

9. The assembly for lifting and transporting a container of claim 1, wherein said ledge further comprises a beveled edge to facilitate alignment of said male part and said female part.

10. The assembly for lifting and transporting a container of claim 1, further comprising a retractable safety pin adapted to be received within a hole in said container capable of restricting movement of said spade relative to said sleeve.

* * * * *